(12) United States Patent
Wing

(10) Patent No.: US 8,782,286 B2
(45) Date of Patent: Jul. 15, 2014

(54) OPTIMIZING STATE SHARING BETWEEN FIREWALLS ON MULTI-HOMED NETWORKS

(75) Inventor: Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1263 days.

(21) Appl. No.: 12/210,038

(22) Filed: Sep. 12, 2008

(65) Prior Publication Data
US 2010/0071050 A1   Mar. 18, 2010

(51) Int. Cl.
*G06F 15/16* (2006.01)
*H04L 29/06* (2006.01)

(52) U.S. Cl.
CPC ......... H04L 63/0218 (2013.01); *H04L 63/0263* (2013.01)
USPC ............................ 709/249; 709/203; 709/227

(58) Field of Classification Search
USPC .......................................... 709/203, 227, 249
See application file for complete search history.

(56) References Cited

U.S. PATENT DOCUMENTS

| | | | |
|---|---|---|---|
| 7,447,796 B2* | 11/2008 | Forrester | 709/238 |
| 7,890,637 B1* | 2/2011 | Zhang et al. | 709/227 |
| 8,085,752 B2* | 12/2011 | Syvanne et al. | 370/349 |
| 2003/0018914 A1* | 1/2003 | Cheng et al. | 713/201 |
| 2003/0055982 A1* | 3/2003 | Noro et al. | 709/227 |
| 2003/0058839 A1* | 3/2003 | D'Souza | 370/352 |
| 2003/0117993 A1* | 6/2003 | Syvanne et al. | 370/349 |
| 2003/0140248 A1* | 7/2003 | Izatt | 713/201 |
| 2005/0140989 A1* | 6/2005 | Tutschke | 356/639 |
| 2006/0191003 A1* | 8/2006 | Bahk et al. | 726/14 |
| 2007/0260921 A1* | 11/2007 | Cankaya et al. | 714/18 |
| 2009/0040926 A1* | 2/2009 | Li et al. | 370/230.1 |
| 2010/0211544 A1* | 8/2010 | Chen et al. | 707/622 |

OTHER PUBLICATIONS

Cisco Systems, "Enhanced IP Resiliency Using Cisco Stateful NAT—White Paper", © 1992-2006 Cisco Systems, Inc., 23 pages.

* cited by examiner

*Primary Examiner* — Duyen Doan

(57) ABSTRACT

In one embodiment, a security device monitors for outgoing re-transmission messages indicating that an endpoint located in a multi-homed network transmitted an unanswered initial connection request. Responsive to identifying one of the outgoing re-transmission messages, the security device identifies destination address information included in the identified re-transmission message. The security device then causes another security device associated with a different link of the same multi-homed network to update its internal state table according to the identified destination address information. As a result, a response to the outgoing re-transmission can be forwarded to the multi-homed network regardless of which security device receives the response.

19 Claims, 5 Drawing Sheets

OPTIMIZING STATE SHARING BETWEEN FIREWALLS ON MULTI-HOMED NETWORKS

TECHNICAL FIELD

The present disclosure relates generally to the field of networking.

BACKGROUND

Enterprise networks and other private networks are often multi-homed for reliability. A multi-homed network is a private network with more than one link to the Internet. The different links can be provided by different Internet Service Providers (ISPs) for increased reliability.

A firewall or other security device can be used to regulate traffic communicated across the links. Although certain efficiencies are achieved by using one security device to manage traffic communicated across all the links, the single security device becomes a single point of failure for the private network.

Accordingly, there is a desire to use different security devices to regulate traffic communicated across the different multi-homed network links. However, distributing different security devices for the different links can result in asymmetric routing problems that can prevent certain connections from being established between the multi-homed network and another network. The disclosure that follows solves this and other problems.

DESCRIPTION OF EXAMPLE EMBODIMENTS

Overview

In one embodiment, a security device monitors for outgoing re-transmission messages indicating that an endpoint located in a multi-homed network transmitted an unanswered initial connection request. Responsive to identifying one of the outgoing re-transmission messages, the security device identifies destination address information included in the identified re-transmission message. The security device then causes another security device associated with a different link of the same multi-homed network to update its internal state table according to the identified destination address information. As a result, a response to the outgoing re-transmission can be forwarded to the multi-homed network regardless of which security device receives the response.

The security device can also be configured to monitor for outgoing initial connection requests. The security device identifies a destination address of identified initial connection requests, and then determines whether the identified destination address is associated with destination addresses included in previous state information exchanges between the security devices. The security device can recognize the association in any manner, such as observing a common routing number between the identified address and the previous addresses, or by observing that the identified address is included in a range that is based on the previous addresses.

Description

Several preferred examples of the present application will now be described with reference to the accompanying drawings. Various other examples of the invention are also possible and practical. This application may be exemplified in many different forms and should not be construed as being limited to the examples set forth herein.

Figure 1:
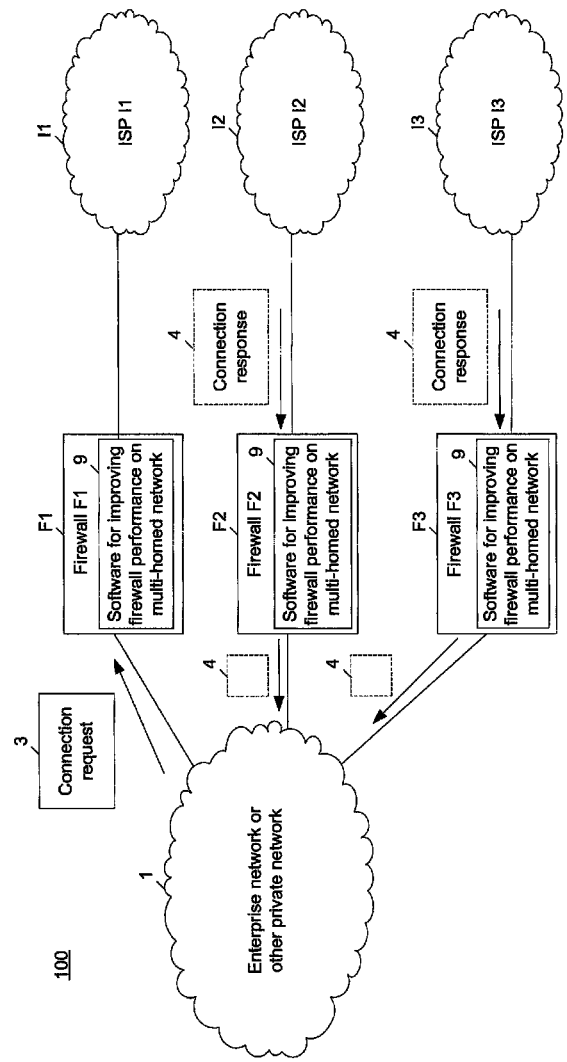
FIG. 1 illustrates an example system including multi-homed network firewalls that can intelligently process connection messages associated with asymmetric connections.

FIG. 1 illustrates an example system including multi-homed network firewalls that can intelligently process connection messages associated with asymmetric connections.

The system 100 includes a plurality of firewalls F1-F3 that regulate traffic exchanged over different multi-homed network 1 links. The firewalls F1-F3 are configured to drop inbound communications from addresses that are not listed in their respective internal state tables, which are created based on address information from respectively processed outbound traffic. In the present example, each of the links couples the network 1 to the Internet through a different one of the Internet Service Providers (ISPs) I1-I3.

The firewalls F1-F3 include software 9 that uses information obtained from outgoing communications to enable asymmetric connections to be established from the network 1. An asymmetric connection is a connection having an outbound communication path extending through a different security device than the corresponding inbound path.

The ability to handle asymmetric connections is important because the ISPs I1-I3 may each independently advertise reachability information for endpoints of the network 1, which the network 1 may not be able to easily control. As a result, a connection response 4 can be received by a different one of the firewalls (either F2 or F3) than the firewall F1 that processed the outgoing connection request 3. As explained in greater detail with reference to FIGS. 2 and 3, the software 9 causes the firewalls F1-F3 to exchange a subset of their locally maintained state information to allow connection response 4 to be passed to the network 1. Due to this state table information exchange, the incoming connection response 4 will be forwarded by receiving firewall F2 or F3, even if this receiving firewall itself has not previously communicated with the remote endpoint, allowing the asymmetric connection to be established. Since only a selected subset of the locally stored state information is synchronized, scalability is maintained.

As will be explained in greater detail later with reference to FIG. 2, one of the ways the software 9 can provide this capability is by leveraging a re-transmission characteristic of certain protocols. Accordingly, although the example that will be described in FIG. 2 references the TCP protocol, it will be apparent that the principles described herein can be applied to other protocols having a re-transmission characteristic.

As will be explained in greater detail with reference to FIG. 3, the software 9 can leverage associations between remote endpoints to minimize re-transmission delays in establishing the asymmetric connections between the network 1 and the associated remote endpoints. Such leveraging of remote endpoint associations to minimize re-transmission delays is an optional further optimization and is not required to practice the principles described with respect to FIG. 2.

Figure 2:
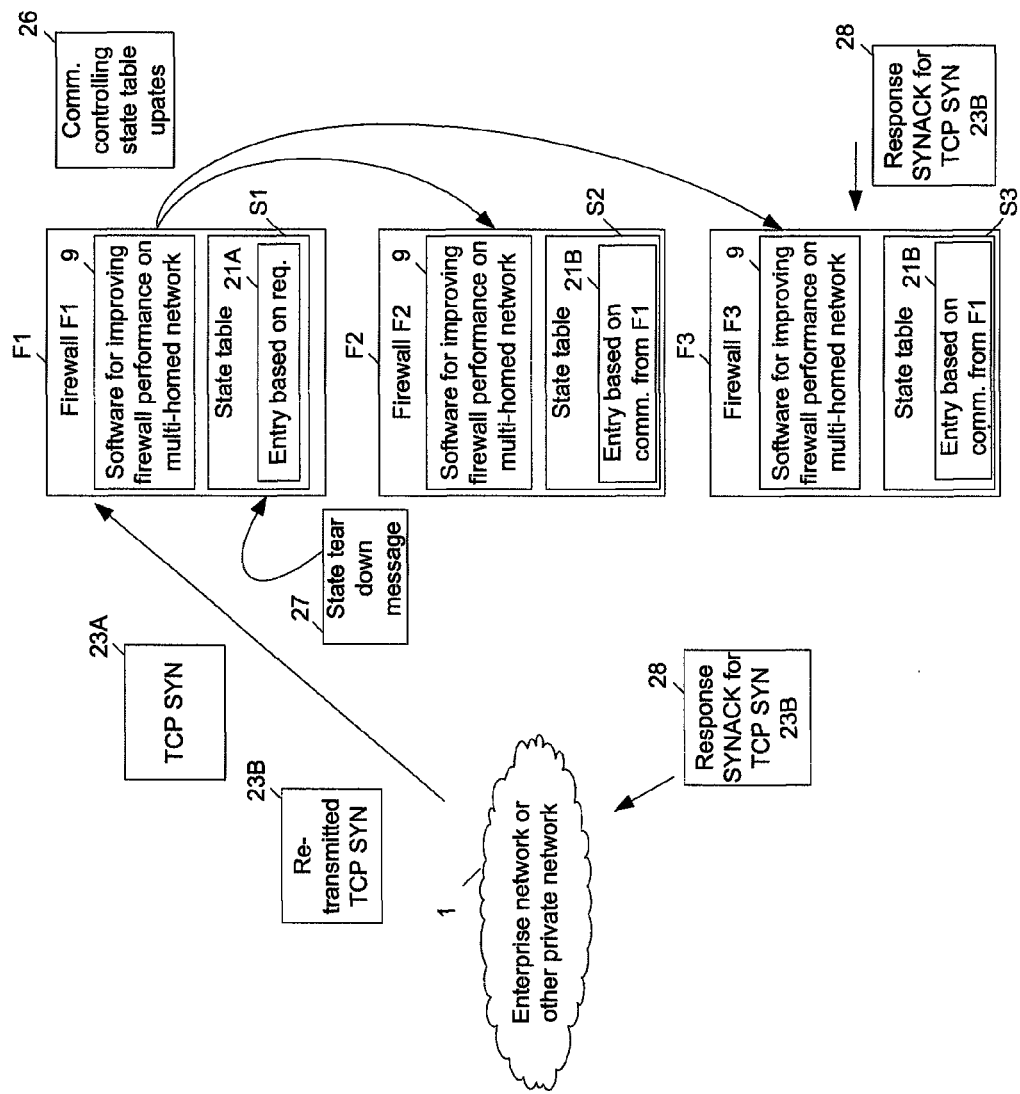
FIG. 2 illustrates how the firewalls shown in FIG. 1 intelligently process the connection messages to permit establishment of the asymmetric connection.

FIG. 2 illustrates how the firewalls shown in FIG. 1 intelligently process the connection messages to permit establishment of the asymmetric connection.

When an endpoint located in the network 1 attempts to establish a TCP connection with a remote endpoint, initially the local endpoint sends a TCP SYN message 23A, which is forwarded outbound by the firewall F1. The firewall F1 contains an internal state table S1 that is used by the firewall F1 for comparing address information of incoming responses to determine whether the incoming responses are forwarded or dropped, namely the firewall F1 drops incoming communications originating from addresses absent from the state table S1. During forwarding of the TCP SYN message 23A, the firewall F1 updates the state table S1 with the state table entry 21A. The state table entry 21A includes a destination address of the TCP SYN message, as well as other information such as a sequence number and 4-tuple.

If a response to this message 23A is received back at a different one of the firewalls, namely F2 or F3, such a different receiving firewall F2 or F3 will typically drop the response because their respective state tables do not include an entry for the source address of the response. When the response to message 23A is dropped, the TCP connection will fail to be established.

By way of background information, the TCP has a re-transmission characteristic whereby an initiating endpoint will automatically send a re-transmission if the response to the TCP SYN was not received in a certain amount of time. Here, due to the TCP re-transmission feature, the TCP SYN message 23B will be sent some time after transmission of the TCP SYN 23A.

The software 9 is configured to monitor for outgoing re-transmission messages such as the TCP SYN 23B. When such a re-transmission message is detected by firewall F1, the software 9 generates a control message 26 to cause the software 9 in the other firewalls F2 and F3 to update their respective state tables S2 and S3 based on state table entry 21A. Specifically, in the present example, the firewalls F2 and F3 update their respective tables with entries 21B, which indicate the same remote address as entry 21A. The firewall F1 can detect the re-transmission message TCP SYN 23B using any method, such as by comparing a sequence number and 4-tuple included in the TCP SYN 23B with the state table S1 containing the entry 21A.

Preferably, the firewall F1 delays forwarding the TCP SYN 23B for some duration after sending the control message 26. The amount of delay should be based on network latency between the firewalls F1-F3 and the processing time associated with the firewalls F2 and F3 receiving the message 26 and completing their state table updates.

The greater the amount of delay in forwarding TCP SYN 23B, the increased chance that the state tables S2 and S3 will be updated at the time a response (TCP SYNACK) 28 to the TCP SYN 23B is received by the firewalls F2 and F3. If the delay is small, the TCP SYNACK 28 may arrive before the state tables S2 and S3 are updated, resulting in the TCP SYNACK 28 being dropped. Accordingly, if a preconfigured delay is used, the amount of delay should be set based on a balance between reliability in establishing connections and response time in establishing messages. If a delay amount is dynamically selected, the dynamic delay may be based on information about current network congestion, current processing utilization of the firewalls F1-F3, and other factors affecting message delivery time and processing time.

After the state tables S2 and S3 are updated, the incoming response 28 is received at one of the firewalls F2 and F3. Due to the presence of entries 21B, the response 28 is forwarded instead of dropped, which allows the TCP connection to be established with asymmetric paths.

When the return path firewall F2 or F3 receives the response 28, the software 9 thereon informs the firewall F1 that sent the communication 26 via message exchange 27. This message exchange 27 is used to co-ordinate firewall F1 tearing down its corresponding state information when the TCP connection is closed, e.g. deleting the entry 21A from its internal state table S1. When the firewall F1 or the return path firewall subsequently observes the TCP FIN or other termination message, that observing firewall notifies the other firewall that participated in the message exchange 27 to initiate state tear-down.

Other firewalls that are not included in the message exchange 27 automatically tear down their state information after a certain amount of time has passed. Preferably, the amount of time is equal to a TCP Maximum Segment Lifetime (MSL), which is two minutes. Alternatively, the return path firewall can notify the non-participating firewall(s) that the return flow has been received such that the non-participating firewall can remove the state information before the two minutes has elapsed.

It should be apparent that, upon detecting the TCP SYN message 23B, the firewall F1 does not have information indicating that the corresponding TCP SYNACK was received and dropped by a different firewall. In fact, the re-transmission may have been initiated for other reasons, such as a failure on the remote endpoint, which cannot be resolved by sending the control communication 26. However, since the overhead for sending the communication 26 and updating the state tables S2 and S3 is relatively low, the software 9 is preferably configured to send the control communication 26 a priori, without waiting to analyze the actual reason for the initial connection failure.

It should also be apparent that, when sending the communication 26, the firewall F1 does not have information indicating which firewall F2 or F3 dropped the corresponding response. Again, since the overhead for sending the communication 26 and updating the state tables S2 and S3 is relatively low, the firewall F1 "broadcasts" the communication 26 a priori, without waiting for a feedback indicating which firewall F2 or F3 may have dropped the initial connection response.

It should be apparent that the operation of the software 9 balances connection delay with scalability. The feature of sending the communication 26 after re-transmissions, instead of flooding such messages after every single initial connection request, prevents state table maintenance and size from approaching unmanageability.

It should be apparent that the principles described are not limited to TCP and can be applied to any other protocols that include a re-transmission characteristic, for example, Domain Name Server (DNS) and Interactive Connectivity Establishment (ICE) connectivity checks. With DNS, the 16-bit query ID can be used for detecting retransmissions, and with ICE, the unique 96-bit transaction ID can be used for detecting retransmissions.

Figure 3:
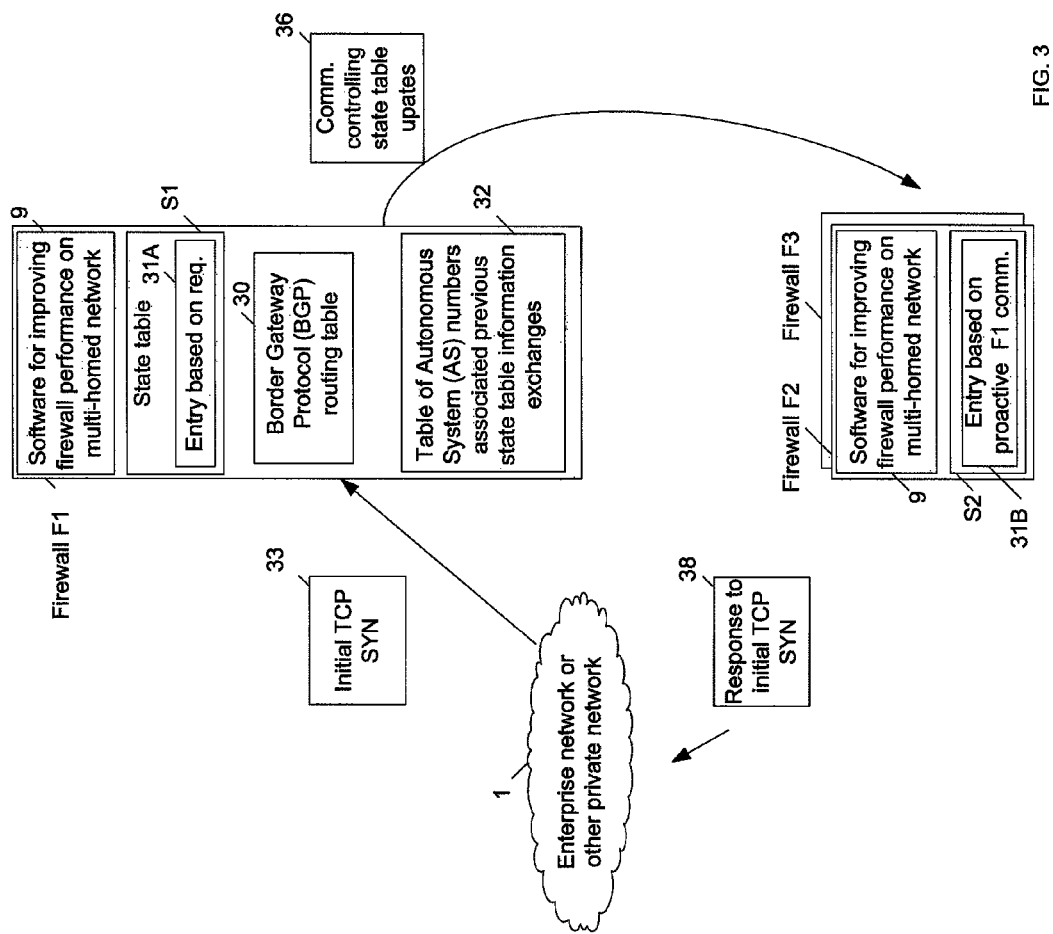
FIG. 3 illustrates how the firewalls shown in FIGS. 1 and 2 can utilize a routing table to minimize re-transmission delays in establishing certain asymmetric connections.

FIG. 3 illustrates how the firewalls shown in FIGS. 1 and 2 can utilize a routing table to minimize re-transmission delays in establishing certain asymmetric connections.

In addition to monitoring for connection message re-transmissions, the software 9 can also be configured to monitor for certain initial connection messages, and then send control communications 36 responsive to detecting these initial connection messages. Such communications 36 can avoid the retransmission delays when certain conditions are met, as will be explained in greater detail below by way of example.

The software 9 is configured to compare initial connection requests, such as initial TCP SYN 33, to a routing table. In the present example, the software 9 compares the TCP SYN 33 with a Border Gateway Protocol (BGP) table 30 internal to the firewall F1. In other examples, the comparison can be performed using any type of routing table, local to the firewall F1, or remote.

Specifically, the software 9 compares a destination address of the TCP SYN 33 to the BGP table 30 to obtain an Autonomous System (AS) number. The software 9 then determines whether the obtained AS number matches an AS number associated with any of the IP addresses included in previous state table information exchanges with the other firewalls F2 and F3. If the match is present, the firewall F1 transmits the communication 36 to cause an entry 31B (similar to the entry 31A in the stable table S1) for the destination address of the initial connection message 33 to be added to state tables S2 and S3.

It has been empirically observed that different endpoints located in a same enterprise network typically have the same AS numbers. It has also been empirically observed that, if a response to a connection request sent to one endpoint in a remote enterprise network is returned over a return path, there is a significant likelihood that a response to a connection request sent from other endpoints in the same remote enterprise network will also be returned over the same return path. As a result, as described previously, when an AS number match exists the software 9 proactively sends the communication 36 without waiting for a re-transmission. However, when there is no AS match, to preserve scaling the firewall F1 performs normal forwarding without sending the communication 36. It should be apparent that, if there was no AS match, but the response arrives over an asymmetric connection path anyway, the software 9 is robust in that the state table information exchange will still occur after the firewall F1 detects the subsequent re-transmission as was described with reference to FIG. 2.

The software 9 can determine whether the AS number match exists using any method. For example, if the state table S1 contains AS numbers, the software 9 can compare the obtained AS number with the state table S1. Or alternatively, the software 9 can maintain a table 32 listing AS numbers associated with state table information exchanges. The table 32 is updated with an AS number for a remote endpoint each time the firewall F1 sends or receives any of the aforementioned state table updates with the other firewalls F2 and F3. For example, the table 32 might include an entry for the previously discussed re-transmission 23B.

The communication 36 can be unicast to a particular one of the firewalls F2 or F3 if the firewall F1 has information indicating which one of the other firewalls F2 or F3 were involved in the communications to the same AS. The firewall F1 may have this knowledge based on the previously discussed message exchange 27 for co-coordinating state tear down. If the communication 36 is unicast, state tear-down is simplified because only the firewalls involved in the TCP connection are updated with the entry 31B. Alternatively, the communication 36 can be broadcast to all the other firewalls similar to the previously discussed communication 26.

As a result of the communication 36, the response 38 to the initial connection request 33 will be forwarded to appropriate endpoint in the network 1 instead of dropped. Thus, it should be apparent that, with the optional configuration of the software 9 as described above, in certain cases asymmetric connections can be provided without re-transmission delays. It should be understood that the optional configuration described above is not required to achieve the functionality described with respect to FIG. 2.

Figure 4:
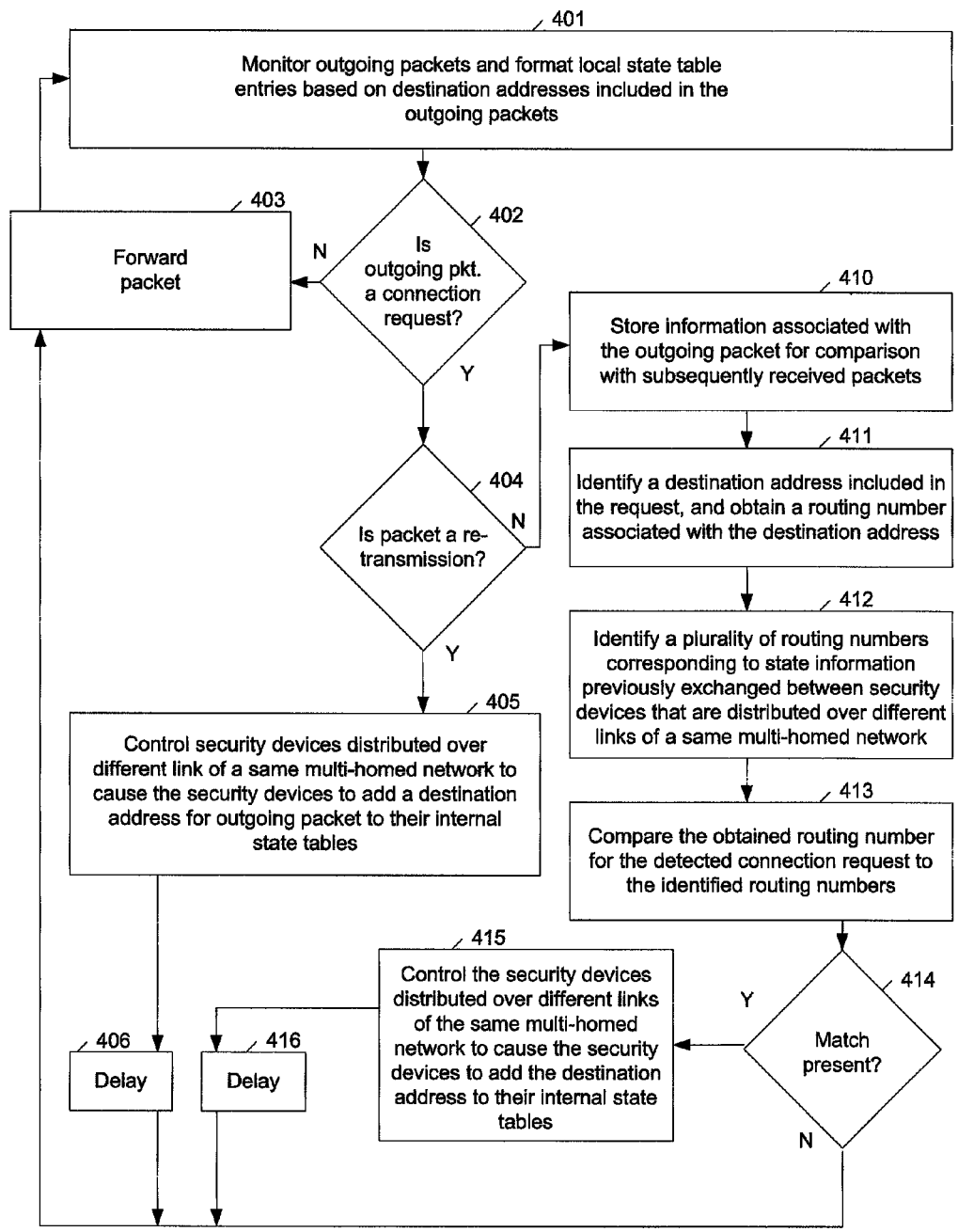
FIG. 4 illustrates an example method for using the firewalls illustrated in FIGS. 1-3.

FIG. 4 illustrates an example method for using the firewalls illustrated in FIGS. 1-3.

In block 401, the software 9 monitors outgoing packets and formats state table entries based on destination addresses included in the outgoing packets. The software 9 also determines which outgoing packets are for connection requests in diamond 402, and for any outgoing packets that are not for connection requests, those packets are forwarded in block 403.

If an outgoing packet is for a connection request, the software 9 determines whether the outgoing packet is a retransmission of a connection request in diamond 404. If the packet is a retransmission, in block 405 the software 9 controls security devices distributed over different links of same multi-homed network to cause the security devices to add a destination address for the outgoing packet to their internal state tables. This typically includes sending a control communication from the security device receiving the outgoing connection request re-transmission to one or more other security devices, where the control communication includes the destination address. In block 406, the software 9 imposes a delay before forwarding the packet (block 403).

If the outgoing packet is a connection request but not a retransmission in diamond 404, in block 410 the software stores information associated with the outgoing packet for comparison with subsequently received packets. In block 411, the software 9 identifies a destination address included in the request, and obtains a routing number associated with the destination address. The routing number can be obtained by comparing the identified address to a routing table typically used by routers. In block 412, the software 9 identifies a plurality of routing numbers corresponding to state information previously exchanged between security devices that are distributed over different links of a same multi-homed network.

In block 413, the software 9 compares the obtained routing number for the packet to the identified routing numbers. If there is no match in diamond 414, the software 9 forwards the packet (block 403).

If there is a match in diamond 414, in block 415 the software 9 controls the security devices distributed over the different links of the same multi-homed network to cause the security devices to add the destination address to their internal state tables. The software 9 also imposes the delay in block 416 before forwarding the packet (block 403).

It should be understood that the principles described above are applicable to any security devices that have a policy of filtering messages received from remote endpoints that are not included in the security device's internal state table. For example, the principles described herein are applicable to Network Address Translation (NAT) devices, as well as firewalls.

It should also be understood that the software 9 can be implemented with or without the processes of blocks 411-416. If implemented without these processes, for connection requests that are not retransmissions the software 9 stores the information (block 410) and forwards the packet without delay (block 403).

Figure 5:
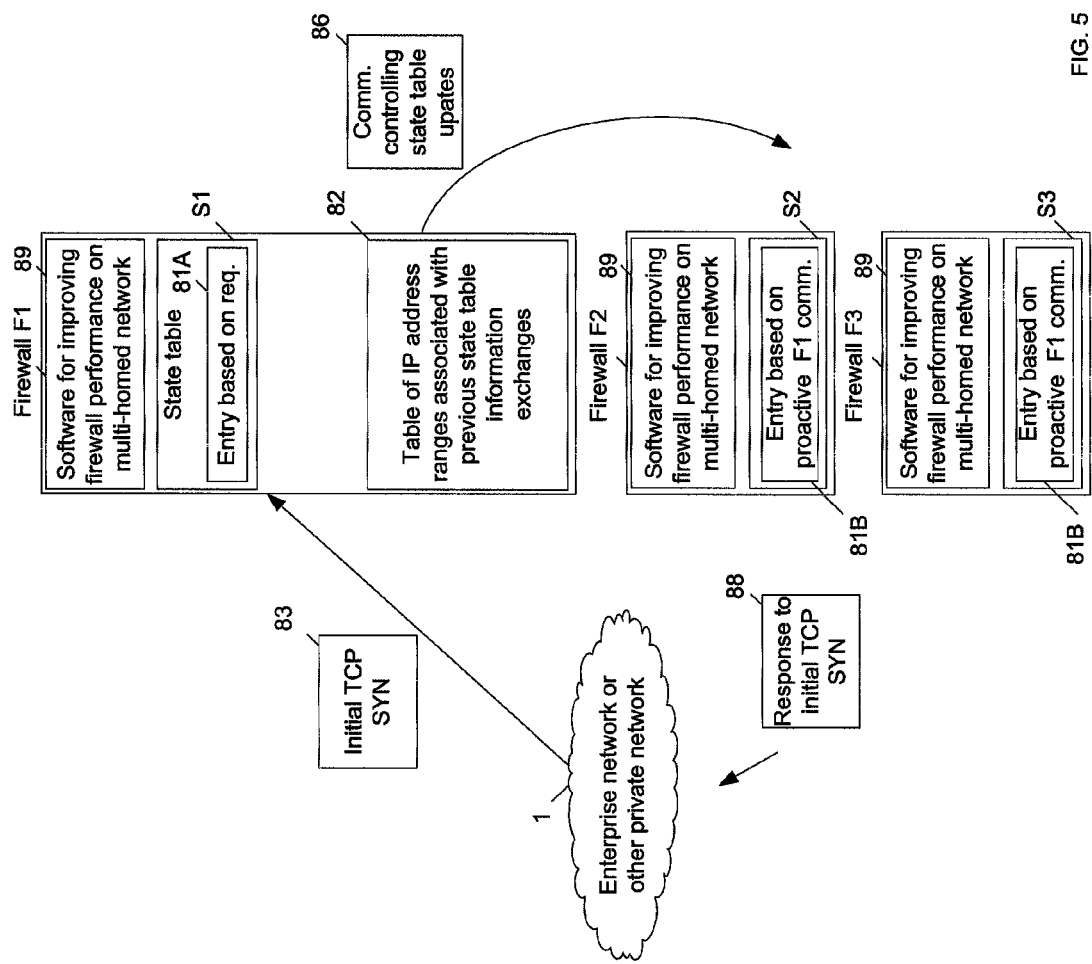
FIG. 5 illustrates another example of multi-homed network firewalls that intelligently process asymmetric connection messages while minimizing re-transmission delays in establishing certain asymmetric connections.

FIG. 5 illustrates another example of multi-homed network firewalls that intelligently process asymmetric connection messages while minimizing re-transmission delays in establishing certain asymmetric connections.

The FIG. 5 illustrates an alternate example applying some of the principles described previously. The software 89 controls state table updates responsive to detecting re-transmissions in a similar fashion as software 9. However, when an initial connection request such as new TCP SYN 83 is received, the software 9 compares a destination address included therein to an IP address range associated with previous state table information exchanges. The software 89 can maintain a table 82 of IP address ranges associated previous state table information exchanges for this comparison. If the destination address is within the address range, the software 89 sends communication 86 to cause the firewalls F2 and F3 to update with an entry 81B, which corresponds to the entry 81A updated on firewall F1. Instead of broadcasting the communication 86, this communication can be unicast to a particular firewall as discussed previously. Thereafter, the response 88 can be forwarded to the network 1 regardless of which of the firewalls F1-F3 receives the response 88.

It should be apparent that a range of IP addresses can be a single IP address. For example, once the software 89 controls a state table synchronization for a re-transmission addressed to a particular endpoint, the software 89 can control state table updates for any subsequently received initial connection requests for that particular endpoint.

The range of IP addresses can be all IP addresses that are part of the same subnet. For example, once the software 89 controls a state table synchronization for a re-transmission addressed to a particular endpoint, the software 89 can control state table updates for any subsequently received initial connection requests for destination addresses belonging to the same subnet of the address for the particular endpoint. This leverages the fact that addresses of the same subnet are typically part of the same remote enterprise network, and if connection requests sent to a first endpoint of a remote enterprise network results in responses over a certain communication path, connection requests to second different endpoints of the same remote enterprise network are likely to result in taking the same communication path.

Several preferred examples have been described above with reference to the accompanying drawings. Various other examples of the invention are also possible and practical. The system may be exemplified in many different forms and should not be construed as being limited to the examples set forth above. For example, it is possible and practice to combine functions of software 9 and 89. For example, a firewall can be configured to control state table updates between security devices whenever an initial connection request has either of a routing number matching routing numbers associated with previous state table information exchanges, or a destination address included within an address range associated with previous state table information exchanges. Often, endpoints in a same network have similar IP addresses, such that the associated between endpoints can be detected by the address range comparison. However, sometimes endpoints in a same network have disparate IP addresses, and thus the association of these endpoints can be eluded by only the address comparison. In such a case, the endpoints are still likely to have a common routing number, thus the routing number comparison will recognize the association between these endpoints.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
one or more processors; and
a memory containing instructions, the processors when executing the instructions operable to:
maintain an internal state table according to information extracted from traffic outgoing from a multi-homed network over a first multi-homed network link to determine whether to forward incoming traffic over the first multi-homed network link according to the maintained state table;
detect a connection request from an endpoint located in the multi-homed network;
determine that the connection request is for a destination not represented by the maintained internal state table, and forward the detected connection request without controlling updating of an internal state table of a security device that processes traffic associated with a second different multi-homed network link;
detect a subsequent outgoing message indicating that the endpoint did not receive a response to the connection request; and
responsive to detecting the outgoing message, communicate state table information to the security device that processes traffic associated with the second different multi-homed network link.

2. The apparatus of claim 1, wherein the processors are further operable to delay forwarding the detected outgoing message relative to other received traffic.

3. The apparatus of claim 2 wherein the delay prevents the destination of the outgoing message from sending a response before the state table information is communicated.

4. The apparatus of claim 1 wherein the processors are further operable to:
broadcast a message to security devices distributed over links providing access to and from the multi-homed network, wherein the broadcast message contains a destination address of the detected outgoing message.

5. The apparatus of claim 1 wherein the processors are further operable to:
control updates to state tables of peer security devices, the state table updates configured to cause the peer security devices to forward incoming traffic received from a destination of the detected message.

6. The apparatus of claim 1 wherein the processors are further operable to:
responsive to identifying the connection request, compare a destination address included in the connection request to a routing table;
identify a routing number according to the comparison;
determine whether the identified routing number is represented by the maintained internal state table;
if the identified routing number is represented by the maintained internal state table, control updating of the internal state table of the security device that processes traffic associated with the second different multi-homed network link; and
if the identified routing number is not represented by the maintained internal state table, forward the detected connection request without controlling updating of the internal state table of the security device that processes traffic associated with the second different multi-homed network link.

7. The apparatus of claim 6 wherein the processors are further operable to:
if the identified routing number is represented by the maintained internal state table, delay forwarding of the detected connection request; and
if the identified routing number is not represented by the maintained internal state table, forward the detected connection request without the delay.

8. The apparatus of claim 2 wherein the delay corresponds to an estimated amount of time for communicating the state table information from the apparatus to the security device and an estimated amount of time for the security device to process an internal state table update.

9. The apparatus of claim 6 wherein detecting the connection request further comprises identifying TCP SYN messages included in the outgoing traffic.

10. The apparatus of claim 9 wherein detecting the outgoing message further comprises identifying acknowledgement requests corresponding to unanswered TCP SYN messages.

11. A method, comprising:
monitoring for outgoing connection requests from an endpoint located in a multi-homed network;
determining that a monitored outgoing connection request is for a destination not represented by a maintained internal state table, and forwarding the detected initial connection request without controlling updating of an internal state table of a security device that processes traffic associated with a different multi-homed network link;
monitoring for outgoing re-transmission messages indicating that the endpoint did not receive a response to the monitored outgoing connection request;
responsive to identifying one of the outgoing re-transmission messages, identifying the destination address included in the identified re-transmission message; and
adding the identified destination address to the internal state tables of a plurality of security devices, wherein one of the plurality of security devices secures links of the different multi-homed network.

12. The method of claim 11, further comprising:
identifying a duration for delaying forwarding of the identified re-transmission message, wherein the duration corresponds to an expected amount of time to complete adding the identified destination address to the internal state tables; and
delaying forwarding of the identified re-transmission message according to the identified duration.

13. The method of claim 11, further comprising:
identifying destination addresses of the identified initial connection requests; and
determining whether the identified destination addresses correspond to a same routing number as remote addresses included in one of the internal state tables.

14. The method of claim 11, further comprising:
identifying destination addresses of the identified initial connection requests; and
determining whether the identified destination addresses are included in an address range, wherein the address range is based on at least one remote address included in the internal state tables.

15. The method of claim 11, further comprising:
exchanging state tear-down communications between a subset of the plurality of security devices responsive to identifying a return path for a response to the outgoing message.

16. The method of claim 15, further comprising:
responsive to the passage of a predetermined amount of time, conducting state tear-down on a security device excluded from the subset, wherein the state-tea down deletes a state table entry corresponding to the destination address.

17. An apparatus, comprising:
one or more processors; and
a memory containing instructions, the processors when executing the instructions operable to:
receive a first outgoing message;
modify only a first state table of a first security device of a first multi-homed network link of a plurality of security devices based on the first outgoing message;
receive a second outgoing message;
determine whether the second outgoing message is a re-transmission indicating the first outgoing message failed to establish a connection with an external device;
in response to determining that the second outgoing message indicates that the first outgoing message failed to establish a connection with the external device, modify a second state table of a second security device of a second different multi-homed network of the plurality of security devices based on the second outgoing message.

18. The apparatus of claim 17, wherein the one or more processors-are further configured to:
in response to determining that the second outgoing message does not indicate that the first outgoing message failed to establish a connection with the external device, forward the outgoing message without modifying the second state table.

19. The apparatus of claim 17, wherein the first state table comprises a local state table and wherein the second state table comprises a remote state table.

* * * * *